(12) United States Patent
Senda

(10) Patent No.: US 8,542,169 B2
(45) Date of Patent: Sep. 24, 2013

(54) DC/DC CONVERTER AND LIQUID CRYSTAL DISPLAY

(75) Inventor: Michiru Senda, Tokyo (JP)

(73) Assignee: Samsung Display Co., Ltd., Yongin, Gyeonggi-Do (KR)

( * ) Notice: Subject to any disclaimer, the term of this patent is extended or adjusted under 35 U.S.C. 154(b) by 1117 days.

(21) Appl. No.: 11/929,282

(22) Filed: Oct. 30, 2007

(65) Prior Publication Data

US 2008/0136991 A1 Jun. 12, 2008

(30) Foreign Application Priority Data

Dec. 7, 2006 (KR) .......................... 10-2006-123963

(51) Int. Cl.
G09G 3/36 (2006.01)
G09G 3/34 (2006.01)
G09G 5/00 (2006.01)
G06F 3/038 (2013.01)

(52) U.S. Cl.
USPC .................. 345/87; 363/60; 257/59; 345/84; 345/211

(58) Field of Classification Search
USPC .................................................. 345/30–111
See application file for complete search history.

(56) References Cited

U.S. PATENT DOCUMENTS

| | | | |
|---|---|---|---|
| 5,349,205 A * | 9/1994 | Kobayashi et al. | 257/59 |
| 6,411,531 B1* | 6/2002 | Nork et al. | 363/60 |
| 7,057,611 B2* | 6/2006 | Lin et al. | 345/211 |
| 2002/0057235 A1* | 5/2002 | Murai et al. | 345/84 |
| 2002/0196208 A1* | 12/2002 | Nanno et al. | 345/55 |
| 2005/0258810 A1 | 11/2005 | Lin | |

FOREIGN PATENT DOCUMENTS

| | | |
|---|---|---|
| JP | 05-152572 | 6/1993 |
| JP | 05-181162 | 7/1993 |
| JP | 06-104437 | 4/1994 |
| JP | 06-334119 | 12/1994 |
| JP | 2002-176764 | 6/2002 |
| JP | 2002-251160 | 9/2002 |
| JP | 2002-299559 | 10/2002 |

* cited by examiner

Primary Examiner — Charles V Hicks
(74) Attorney, Agent, or Firm — F. Chau & Associates, LLC

(57) ABSTRACT

A DC/DC converter of a liquid crystal display includes a charge pump having a thin film transistor, a capacitor and a diode. The thin film transistor is formed on an insulating substrate. A first main electrode of the thin film transistor is connected to an output terminal and a control electrode of the thin film transistor receives a control signal. The thin film transistor includes a non-monocrystal semiconductor. The capacitor has a first electrode connected to a second main electrode of the thin film transistor and a second electrode receiving a variable voltage. The diode is electrically connected between the second main electrode of the thin film transistor, the first electrode of the capacitor, and a power terminal in series. The diode includes a mono-crystal semiconductor.

20 Claims, 12 Drawing Sheets

DC/DC CONVERTER AND LIQUID CRYSTAL DISPLAY

CROSS-REFERENCE TO RELATED APPLICATION

This application claims priority to Korean Patent Application No. 2006-123963, filed on Dec. 7, 2006, the disclosure of which is herein incorporated by reference in its entirety.

BACKGROUND OF THE INVENTION

1. Technical Field

The present disclosure relates to a DC/DC converter and a liquid crystal display.

2. Discussion of Related Art

A liquid crystal display may include a liquid crystal display part formed on a transparent glass substrate, a driver provided in the vicinity of the liquid crystal display part, and a DC/DC converter that supplies a driving voltage to the driver. The liquid crystal display part has a plurality of pixels arranged thereon in a matrix. Each pixel includes a thin film transistor, a pixel electrode electrically connected to a source area of the thin film transistor in series, a common pixel electrode facing the pixel electrode, and a liquid crystal interposed between the pixel electrode and the common pixel electrode. A horizontal scanning line is connected to a drain electrode of the thin film transistor of the pixel, and a vertical scanning line is connected to a gate electrode.

The demand for large-sized liquid crystal television displays for home and business use has increased. The demand for middle-sized, or small-sized liquid crystal displays, such as those sized at 20-inches or less, which are typically employed for portable phones, radio devices, digital cameras, and laptops, has also increased.

In the middle-sized or small-sized liquid crystal display, the area of peripheral circuits of a liquid crystal display part is reduced as compared to large-sized displays. The liquid crystal display part has to be received in a restricted space of a body of the portable terminal.

Technology has been developed to directly fabricate peripheral circuits on a transparent glass substrate of a liquid crystal display part to deal with the restricted space. The peripheral circuits include devices such as thin film transistors for pixels of the liquid crystal display part, a vertical driver that selectively drives vertical scanning lines, a horizontal driver that selectively drives horizontal scanning lines, and a DC/DC converter. A charge pump of the DC/DC converter includes a thin film transistor.

In the manufacturing process of a liquid crystal display, since a thin film transistor is manufactured on a transparent glass substrate that is vulnerable to high-temperature heat treatment, the thin film transistor employs a polycrystalline silicon film (low-temperature poly-silicon film), which is formed in a low-temperature process. A channel area, a source area, and a drain area of the thin film transistor are formed by using the low-temperature poly-silicon film. The thin film transistor includes a gate oxide layer formed on the surface of the channel area and a gate electrode formed on the surface of the gate oxide layer, in addition to the channel area, the source area, and the drain area. The gate oxide layer may be formed through a chemical vapor deposition (CVD) process.

However, the DC/DC converter and the liquid crystal display equipped with the DC/DC converter are manufactured without taking the following factors into consideration. Most middle-sized or small-sized liquid crystal displays are driven by power supplied from a battery instead of power from an external power source. The driving voltage of a liquid crystal display can be lowered to reduce power consumption. A signal or voltage boosted or dropped by the charge pump of the DC/DC converter is used inside the liquid crystal display. The DC/DC converter may be provided with a low voltage, such as 3V. A voltage boost charge pump supplied with low-voltage power includes a p-channel conductive-type thin film transistor. The transistor is used as a switching device to control current between a power source terminal and a voltage boost capacitor. However, since the channel area of the thin film transistor is formed by using a low-temperature poly-silicon film, and the position and the scale of a grain boundary are irregularly formed, a threshold voltage Vth of the thin film transistor is irregular. In addition, since the channel area includes a low-temperature poly-silicon film, the gate oxide layer formed on the channel area may have an irregular property, and the threshold voltage Vth of the thin film transistor may be irregular. Due to the irregularities, a potential difference Vgs between a gate voltage and a source area of the thin film transistor is insufficient and the capability of a driving current of the thin film transistor may be degraded. A voltage drop charge pump of the DC/DC converter includes an n-channel conductive-type thin film transistor used as a switching device that controls current between a grounding terminal and a voltage drop capacitor. Since the n-channel conductive-type thin film transistor includes a channel area formed by using a low-temperature poly-silicon film similar to the p-channel conductive-type thin film transistor, the capability of the driving current of the thin film transistor is degraded.

The above voltage boost and drop charge pumps degrade voltage boost and drop characteristics, and reduce a display rate in a liquid crystal display part of a liquid crystal display. Thus, there is a need for a DC/DC converter which can improve voltage boost or drop characteristics of a charge pump.

SUMMARY OF THE INVENTION

In an exemplary embodiment of the present invention, a DC/DC converter includes a charge pump. The charge pump includes a thin film transistor, a capacitor, and a diode. The thin film transistor is disposed on an insulating substrate. A first main electrode of the thin film transistor is connected to an output terminal and a control electrode of the thin film transistor receives a control signal. The thin film transistor includes a non-monocrystal semiconductor. The capacitor has a first electrode connected to a second main electrode of the thin film transistor and a second electrode receiving a variable voltage. The diode is electrically connected between the second main electrode of the thin film transistor, the first electrode of the capacitor, and a power terminal in series. The diode includes a mono-crystal semiconductor.

In an exemplary embodiment of the present invention, a liquid crystal display includes an insulating substrate, a pixel array, a driver, and a DC/DC converter. The insulating substrate is divided into a first area and a second area adjacent to the first area. The pixel array is arranged in the first area of the insulating substrate. The driver is arranged in the second area of the insulating substrate and drives the pixel array. The DC/DC converter is arranged in the second area of the insulating substrate to supply a driving voltage to the driver. The DC/DC converter includes a charge pump that includes a thin film transistor, a capacitor, and a diode. The thin film transistor is arranged in the second area of the insulating substrate. The thin film transistor has a first main electrode connected to an output terminal and a control electrode receiving a control signal. The thin film transistor includes a non-monocrystal semiconductor. The capacitor has a first electrode connected to a second main electrode of the thin film transistor and a second electrode receiving a variable voltage. The diode is electrically connected between the second main electrode of the thin film transistor, the first electrode of the capacitor, and a power terminal in series. The diode includes a mono-crystal semiconductor.

In an exemplary embodiment of the present invention, a liquid crystal display includes an insulating substrate, a pixel array, a driver, a DC/DC converter, and a flexible printed wiring substrate. The insulating substrate is divided into a first area and a second area adjacent to the first area. The pixel array is arranged in the first area of an insulating substrate. The driver drives the pixel array. The DC/DC converter is arranged in the second area of the insulating substrate to supply a driving voltage to the driver. The flexible printed wiring substrate is adjacent to the insulating substrate. The DC/DC converter includes a charge pump that includes a thin film transistor, a capacitor, and a diode. The thin film transistor is arranged in the second area of the insulating substrate. The thin film transistor has a first main electrode connected to an output terminal and a control electrode receiving a control signal. The thin film transistor includes a non-monocrystal semiconductor. The capacitor has a first electrode connected to a second main electrode of the thin film transistor and a second electrode receiving a variable voltage. The diode is disposed on the flexible printed wiring substrate. The diode is electrically connected between the second main electrode of the thin film transistor, the first electrode of the capacitor, and a power terminal in series. The diode includes a mono-crystal semiconductor.

In an exemplary embodiment of the present invention, a liquid crystal display includes an insulating substrate, a pixel array, a driver, a DC/DC converter, and a printed circuit board. The insulating substrate is divided into a first area and a second area adjacent to the first. The pixel array is arranged in the first area of the insulating substrate. The driver drives the pixel array. The DC/DC converter is arranged in the second area of the insulating substrate to supply a driving voltage to the driver. The printed circuit board controls the pixel array, the driver, and the DC/DC converter. The DC/DC converter includes a charge pump that includes a thin film transistor, a capacitor, and a diode. The thin film transistor is arranged in the second area of the insulating substrate. The thin film transistor has a first main electrode connected to an output terminal and a control electrode receiving a control signal. The thin film transistor includes a non-monocrystal semiconductor. The capacitor has a first electrode connected to a second main electrode of the thin film transistor and a second electrode receiving a variable voltage. The first diode is disposed on the printed circuit board. The diode is electrically connected between the second main electrode of the thin film transistor, the first electrode of the capacitor, and a power terminal in series. The diode includes a mono-crystal semiconductor.

BRIEF DESCRIPTION OF THE DRAWINGS

The present invention will become readily apparent by reference to the following detailed description when considered in conjunction with the accompanying drawings wherein.

DETAILED DESCRIPTION OF EXEMPLARY EMBODIMENTS

Figure 5:
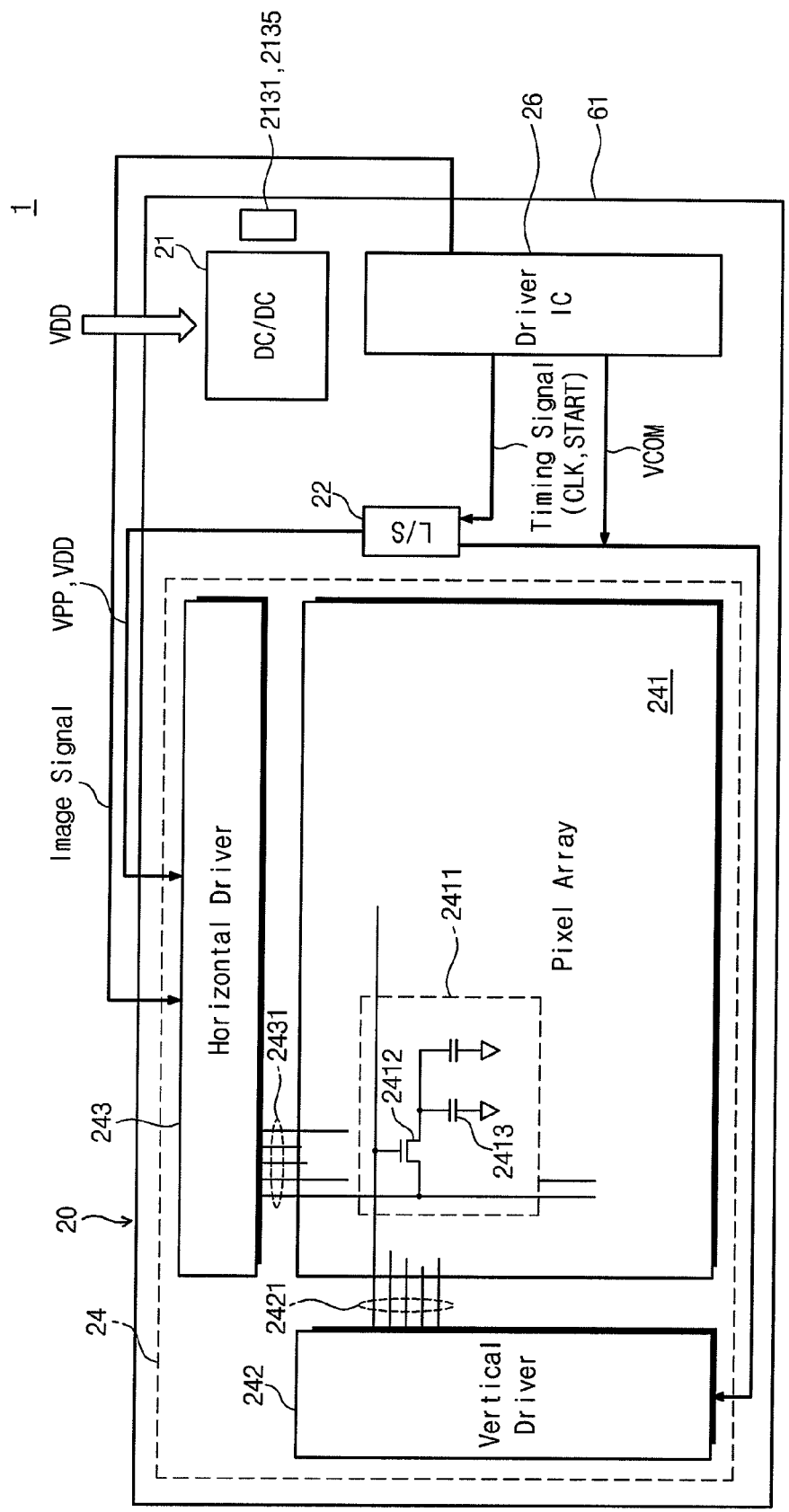
FIG. 5 is a block diagram showing a liquid crystal display according to an exemplary embodiment of the present invention.

As shown in FIG. 5, a liquid crystal display 1 according to an exemplary embodiment of the present invention includes a liquid crystal display panel 20. The liquid crystal display 1 may be a middle-sized or small-sized liquid crystal display, for example, 20 inches or less, and be employed in various devices, such as portable phones, radio devices, digital cameras, and laptop computers. However, the present invention is not limited to any particular size display or any particular device.

The liquid crystal display panel 20 includes a DC/DC converter 21, a level shifter (L/S) 22, a liquid crystal display unit 24, and a driver integrated circuit (IC) 26. The liquid crystal display panel 20 receives a circuit driving voltage VDD externally or from the driver IC 26, and receives a timing signal, an image signal, and a common pixel voltage VCOM from the driver IC 26. The circuit driving voltage VDD is supplied from a battery. The liquid crystal display 1 may include a device that can supply the circuit driving voltage VDD to the liquid crystal display panel 20 from an external power source through an AC/DC unit when the battery is charged.

The liquid crystal display unit 24 includes a pixel array 241, in which a plurality of pixels 2411 are arranged in the form of a matrix, a horizontal driver 243, which is provided along one lateral side (e.g., a top lateral side in FIG. 5) of the pixel array 241, and a vertical driver 242, which is provided along another lateral side (e.g., a left lateral side in FIG. 5) of the pixel array 241. In the pixel array 241, a vertical scanning line (e.g., a gate signal line) 2421 extends horizontally as shown in FIG. 5. The scanning line 2421 is connected to the vertical driver 242. In the pixel array 241, a horizontal scanning line (e.g., image data signal line) 2431 extends vertically as shown in FIG. 5, and is connected to the horizontal driver 243. One pixel 2411 is formed by a series circuit of an n-channel conductive-type thin film transistor (TFT) 2412 used as a switching device and a pixel capacitor 2413. The vertical scanning line 2421 is connected to a gate electrode of the thin film transistor 2412, and the horizontal scanning line 2431 is connected to a drain electrode of the thin film transistor 2412.

Figure 6:
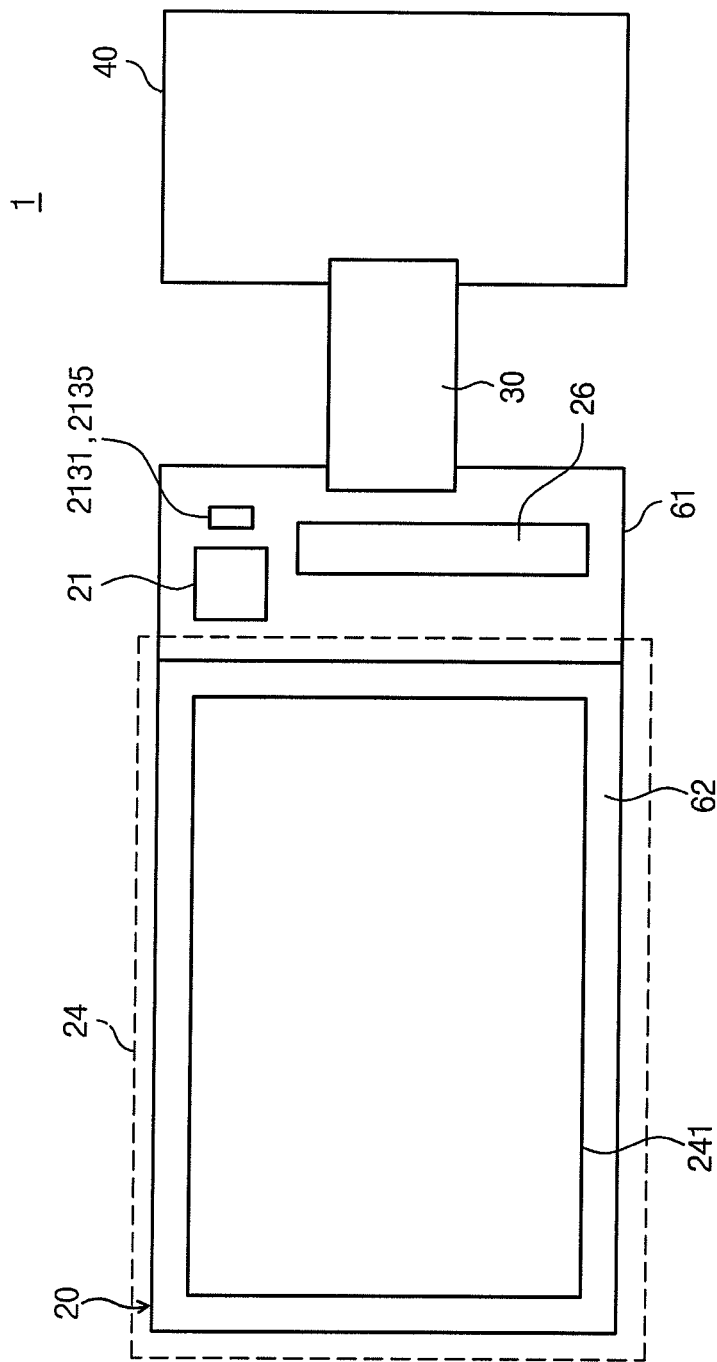
FIG. 6 is an assembled view of the liquid crystal display shown in FIG. 5.

As shown in FIG. 6, the liquid crystal display 1 includes the liquid crystal display panel 20 shown in FIG. 5, a flexible wiring substrate 30 having a first end portion connected to one lateral side of the liquid crystal display panel 20 (e.g., an insulating substrate 61), and a second end portion connected to a printed circuit board 40. The printed circuit board 40 controls the pixel array 241, the vertical driver 242, the horizontal driver 243, and the DC/DC converter 21. The liquid crystal display panel 20, the flexible wiring substrate 30, and the printed circuit board 40 may be manufactured by a single manufacturer or at least two manufacturers, and then assembled as a liquid crystal display shown in FIG. 6.

The liquid crystal display panel 20 includes the insulating substrate 61 having a rectangular shape, an opposite substrate 62 having a rectangular shape smaller than the insulating substrate 61 facing the surface of the insulating substrate 61, a color filter (not shown) provided at a side of the opposite substrate 62 interposed between the insulating substrate 61 and the opposite substrate 62, and a liquid crystal (not shown) interposed between the color filter and the insulating substrate 61. Since the liquid crystal display is a transmissive type, a transparent glass substrate may be adapted for both the insulating substrate 61 and the opposite substrate 62.

The pixel array 241 shown in FIG. 5 is provided at the overlapping area of the insulating substrate 61 and the opposite substrate 62. The vertical scanning line 2421, the horizontal scanning line 2431, the thin film transistor 2412 of the pixel array 241, and the first electrode (e.g., a pixel electrode) of the pixel capacitor 2413 are provided on the insulating substrate 61. The second electrode (e.g., a common electrode) of the pixel capacitor 2413 is provided on the opposite substrate 62.

The DC/DC converter 21 and the driver IC 26 are provided along one lateral side of the insulating substrate 61 in an area in which the insulating substrate 61 does not overlap with the opposite substrate 62. This lateral side of the insulating substrate 61 is connected to the first end portion of the flexible wiring substrate 30. The components constituting the DC/DC converter 21 basically have the same structure as those of the thin film transistor 2412 of the pixel 2411 of the pixel array 241, and may be manufactured through the same manufacturing process when the liquid crystal display panel 20 of the liquid crystal display 1 is manufactured.

The printed circuit board 40 may be installed in a portable phone to control the driving of the liquid crystal display panel 20 to perform display operations necessary for the operation of the portable phone, for example, the display operations for a phone number, a received message, and an originated message. The printed circuit board 40 may be formed by mounting circuits (e.g., ICs) and elements (e.g., resistors and capacitors) on a wiring substrate manufactured as a base including a glass epoxy resin.

Figure 3:
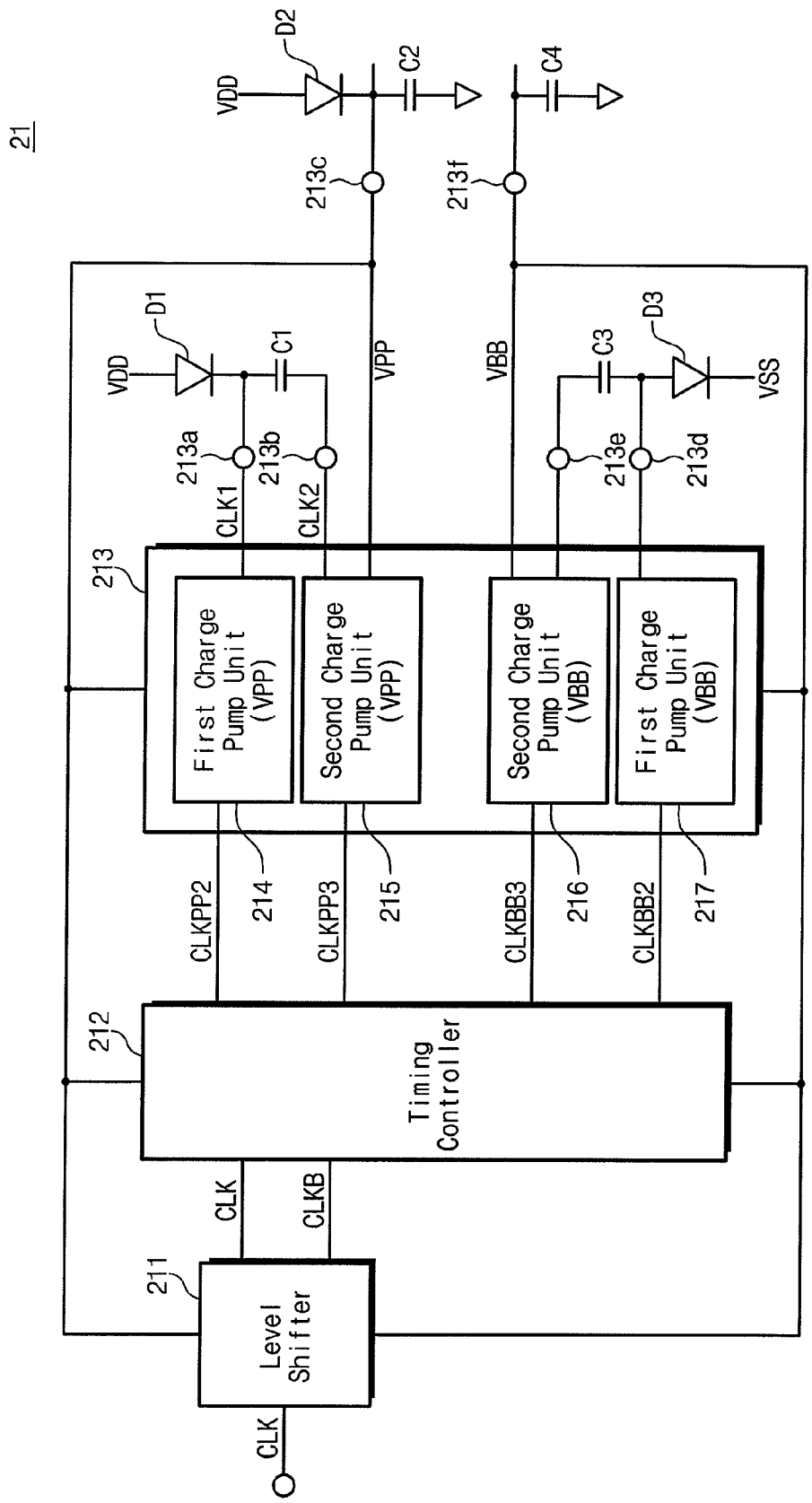
FIG. 3 is a block diagram showing a DC/DC converter according to an exemplary embodiment of the present invention.

As shown in FIG. 3, the DC/DC converter 21 includes a level shifter 211, a timing controller 212, and a charge pump 213. The level shifter 211 receives a clock signal CLK output from the driver IC 26 shown in FIGS. 5 and 6. The level shifter 211 generates clock signals CLK and CLKB based on the clock signal CLK output from the driver IC 26, and outputs the generated clock signals CLK and CLKB to the timing controller 212. The level shifter 211 supplies a signal having an enlarged amplitude to the timing controller 212.

Figure 4:
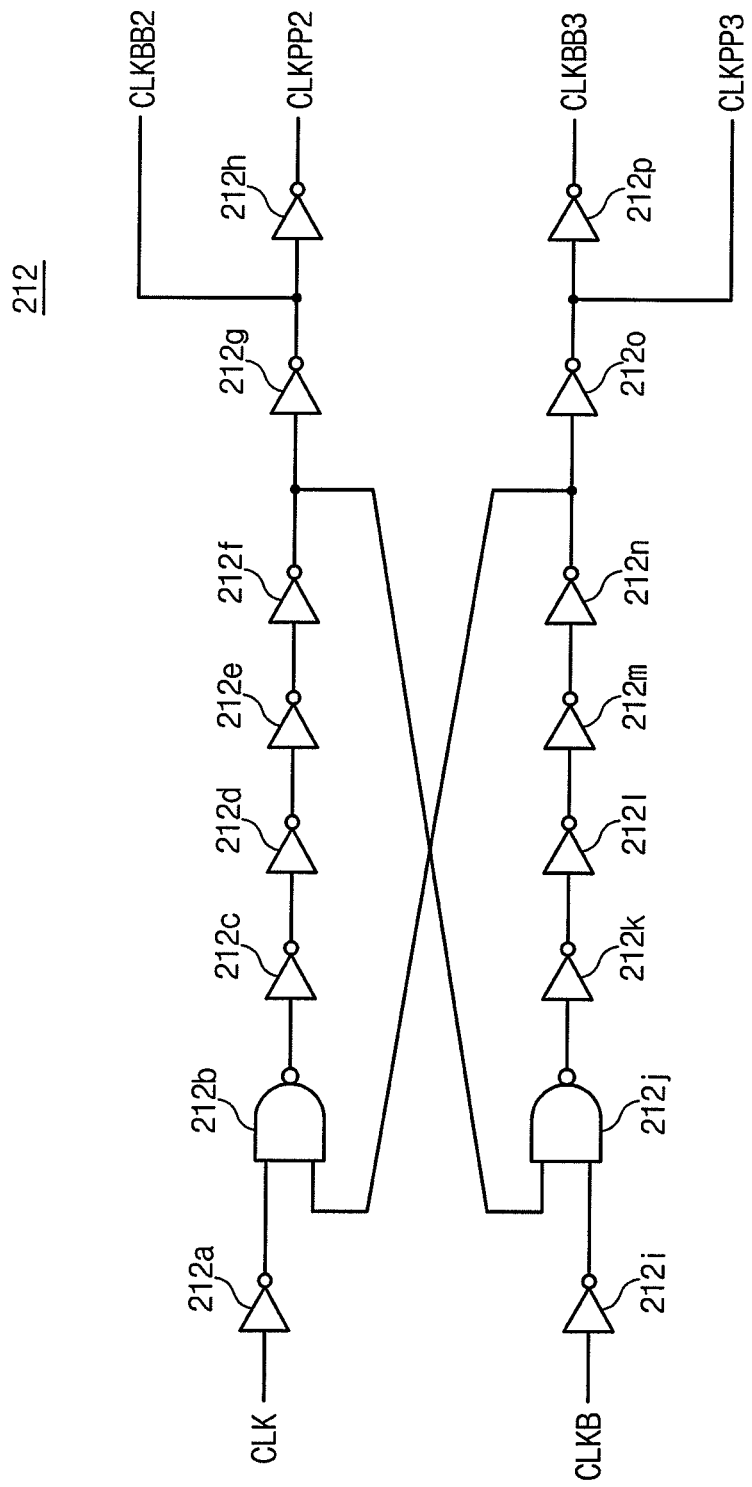
FIG. 4 is a circuit diagram showing a timing controller of FIG. 3.

As shown in FIG. 4, the timing controller 212 includes an inverter 212a, a two-input NAND gate 212b, inverters 212c to 212h to control the timing of the generated clock signal CLK, an inverter 212i, a two-input NAND gate 212j, and inverters 212k to 212p to control the timing of the generated clock signal CLKB. The two-input NAND gate 212b outputs a clock signal to the inverter 212c based on the input of clock signals from the inverter 212a and the inverter 212n. The two-input NAND gate 212j outputs a clock signal to the inverter 212k based on the input of clock signals from the inverters 212i and 212f. The timing controller 212 outputs a clock signal CLKBB2, a clock signal CLKPP2, a clock signal CLKPP3, and a clock signal CLKBB3 from the inverter 212g, the inverter 212h, the inverter 212o, and the inverter 212p, respectively, in the final stage.

The charge pump 213 includes the first charge pump unit (VPP) 214 receiving the clock signal CLKPP2, the second charge pump unit (VPP) 215 receiving the clock signal CLKPP3, the second charge pump unit (VBB) 216 receiving the clock signal CLKBB3, and the first charge pump unit (VBB) 217 receiving the clock signal CLKBB2. The first charge pump unit (VPP) 214 and the second charge pump unit (VPP) 215 constitute a voltage boost charge pump, and the second charge pump unit (VBB) 216 and the first charge pump unit (VBB) 217 constitute a voltage drop charge pump.

A diode D1 is inserted between an output terminal 213a of the first charge pump unit (VPP) 214 and a terminal of a circuit driving voltage (VDD). A capacitor C1 is inserted between the output terminal 213a and an output terminal 213b of the second charge pump unit (VPP) 215. A diode D2 is inserted between an output terminal 213c of the second charge pump unit (VPP) 215 and the second terminal of circuit driving voltage (VDD). A capacitor C2 is inserted between the output terminal 213c and a terminal of a circuit grounding voltage (VSS). The circuit driving voltage (VDD) is supplied to a battery and the circuit grounding voltage (VSS) is a grounding voltage. For example, the VDD may be 3 volts and the VSS may be 0 volts.

A diode D3 is inserted between an output terminal 213d of the first charge pump unit (VBB) 217 and a terminal of the circuit grounding voltage (VSS). A capacitor C3 is inserted between the output terminal 213d and an output terminal 213e of the second charge pump unit (VBB) 216. A capacitor C4 is inserted between an output terminal 213f of the second charge pump unit (VBB) 216 and the terminal of the circuit grounding voltage (VSS).

Figure 1:
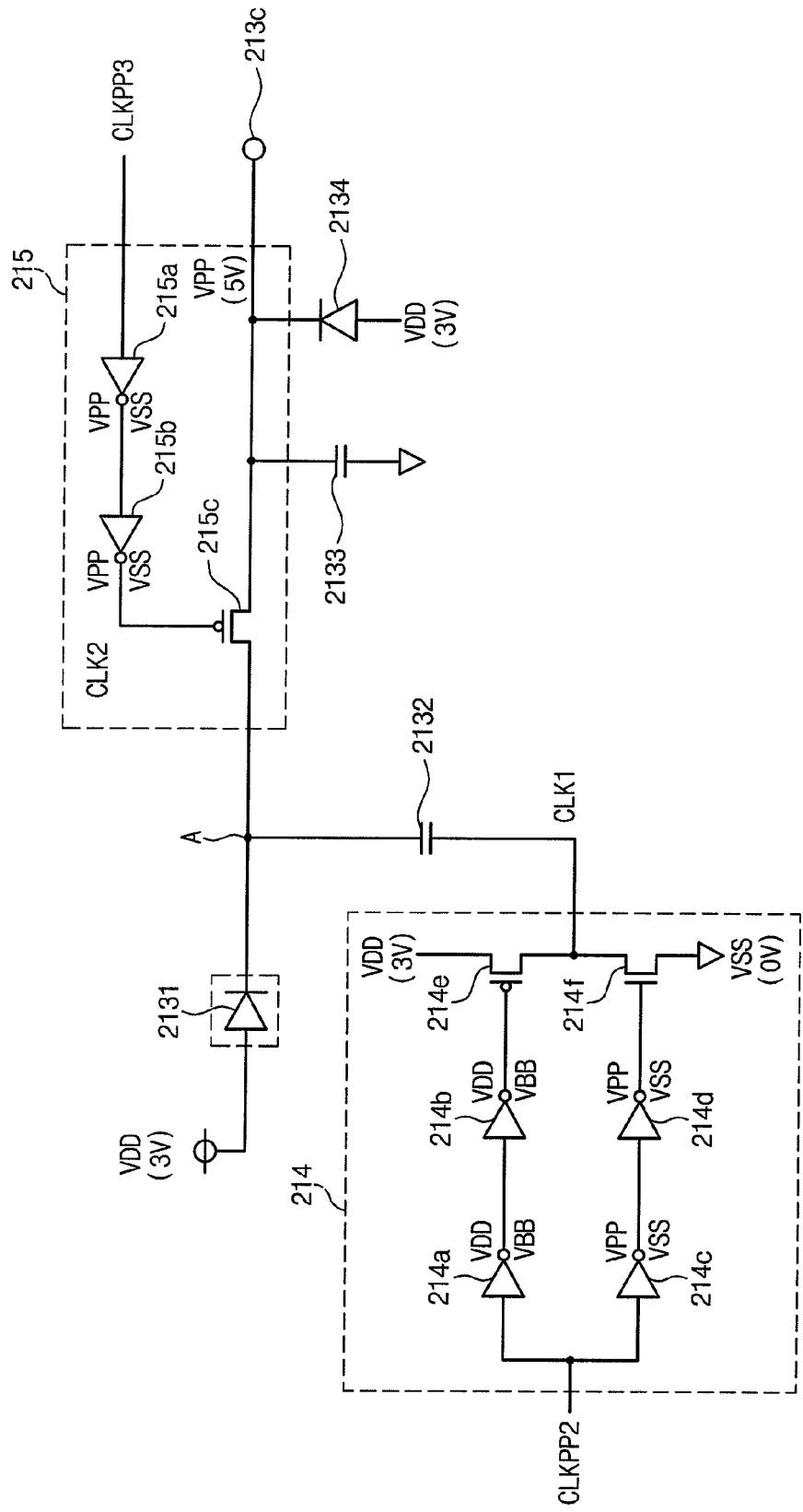
FIG. 1 is a circuit diagram showing a voltage boost charge pump of a DC/DC converter according to an exemplary embodiment of the present invention.

As shown in FIG. 1, the first charge pump unit (VPP) 214 of the charge pump 213 includes first serially connected inverters 214a and 214b, second serially connected inverters 214c and 214d, and complementary transistors, which receives the clock signal CLKPP2 output from the timing controller 212. The complementary transistors include a p-channel conductive-type thin film transistor 214e and an n-channel conductive-type thin film transistor 214f. A control electrode (e.g., a gate electrode) of the p-channel conductive-type thin film transistor 214e receives the output of the inverter 214b. A control electrode of the n-channel conductive-type thin film transistor 214f receives the output of the inverter 214d. The complementary transistors output a clock signal CLK1. A thin film transistor constituting the DC/DC converter 21 may be manufactured through the same manufacturing process as the thin film transistor 2412 forming a pixel 2411 of the pixel array 241. The channel area, the source area, and the drain area of the thin film transistor may be manufactured by using a non-monocrystal semiconductor of a low-temperature poly-silicon film. The term "non-monocrystal semiconductor" refers to both polycrystalline silicon and amorphous silicon, which may be manufactured through a low-temperature process which does not adversely affect the insulating substrate 61. The non-monocrystal semiconductor does not include a monocrystal semiconductor. The thin film transistor may include an organic thin film transistor requiring a film manufactured through a low-temperature process.

The second charge pump unit (VPP) 215 includes inverters 215a and 215b, which are serially connected to each other while receiving the clock signal CLKPP3 output from the timing controller 212, and a p-channel conductive-type thin film transistor 215c, a control electrode of which receives the output of the inverter 215b. The first main electrode (e.g., a source area), which is positioned at a first side of the thin film transistor 215c, is connected to the output terminal 213c. A channel area, a source area, and a drain area of the thin film transistor 215c include a non-monocrystal semiconductor.

The charge pump 213 includes a voltage boost capacitor 2132, which has a first electrode connected to the second main electrode (drain area) of the thin film transistor 215c. The second electrode receives the clock signal CLK1 (e.g., a variable voltage) from the first charge pump unit (VPP) 214. A first diode 2131 is serially connected between the second main electrode of the thin film transistor 215c, the first electrode of the voltage boost capacitor 2132, and the terminal of the circuit driving voltage (VDD) (e.g., a terminal of a power source), and includes a monocrystal semiconductor. The diode 2131 has an anode area connected to the terminal of circuit driving voltage (VDD) and a cathode area connected to the second main electrode of the thin film transistor 215c. Monocrystal silicon is preferably used as the monocrystal semiconductor. The diode 2131 includes a p-type monocrystal silicon for the anode area and an n-type semiconductor area for the cathode area. The cathode area is formed in the vicinity of the anode area.

Figure 7:
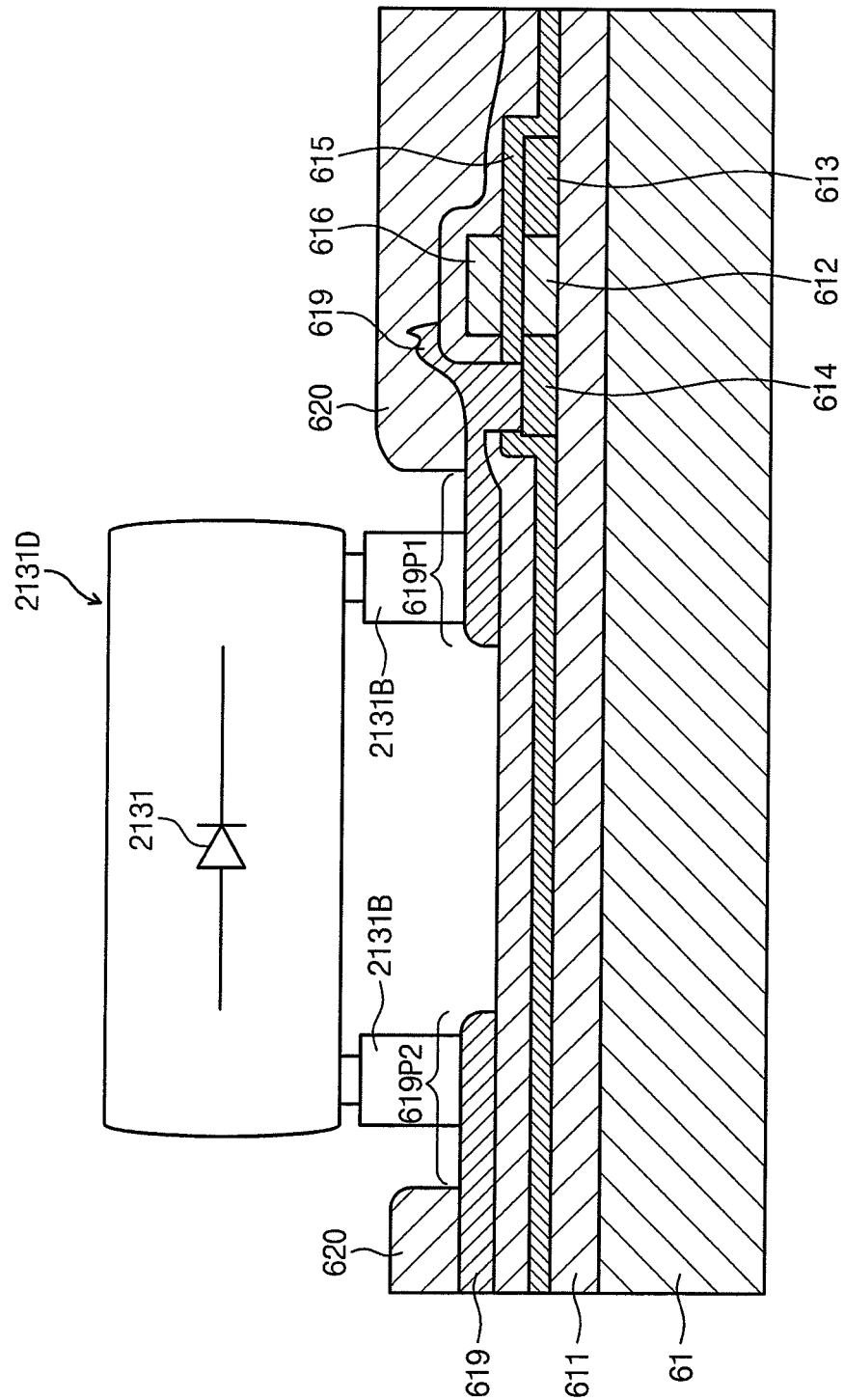
FIG. 7 is an enlarged sectional view showing main parts of the liquid crystal display shown in FIG. 6.

As shown in FIG. 7, the thin film transistor 215c is formed by disposing a passivation layer 611 on the surface of the insulating substrate 61, and includes a channel area 612, the first main electrode 613, the second main electrode 614, a gate oxide layer 615, and a control electrode (gate electrode) 616. The channel area 612, the first main electrode 613, and the second main electrode 614 include a monocrystal semiconductor. One end portion of an interconnection 619 is connected to the second main electrode 614 of the thin film transistor 215c, and the other end portion of the interconnection 619 is withdrawn to the exterior from a lower portion of a final passivation layer 620 or exposed by a via hole to be used as an external connection terminal 619P1. The second end portion of the interconnection 619, which has the first end portion connected to the terminal of the circuit driving voltage VDD, is used as an external connection terminal 619P2.

The diode 2131 is provided in the form of an external connection device 2131D by packaging a monocrystal semiconductor (e.g., a monocrystal semiconductor chip). The external connection device 2131D includes an adhesion layer 2131B to be electrically and mechanically connected to the external connection terminals 619P1 and 619P2. The adhesion layer 2131B includes an anisotropic conductive film (ACF).

As shown in FIGS. 5 and 6, the diode 2131 (e.g., an external connection device 2131D) is mounted on an area, in which the opposite substrate 62 is not provided, on the surface of the insulating substrate 61 according to an exemplary embodiment of the present invention. The diode 2131 is mounted in a dead space of a corner of the insulating substrate 61 in the vicinity of the DC/DC converter 21. The diode 2131 may be mounted in a chip-on-glass (COG) structure.

Figure 8:
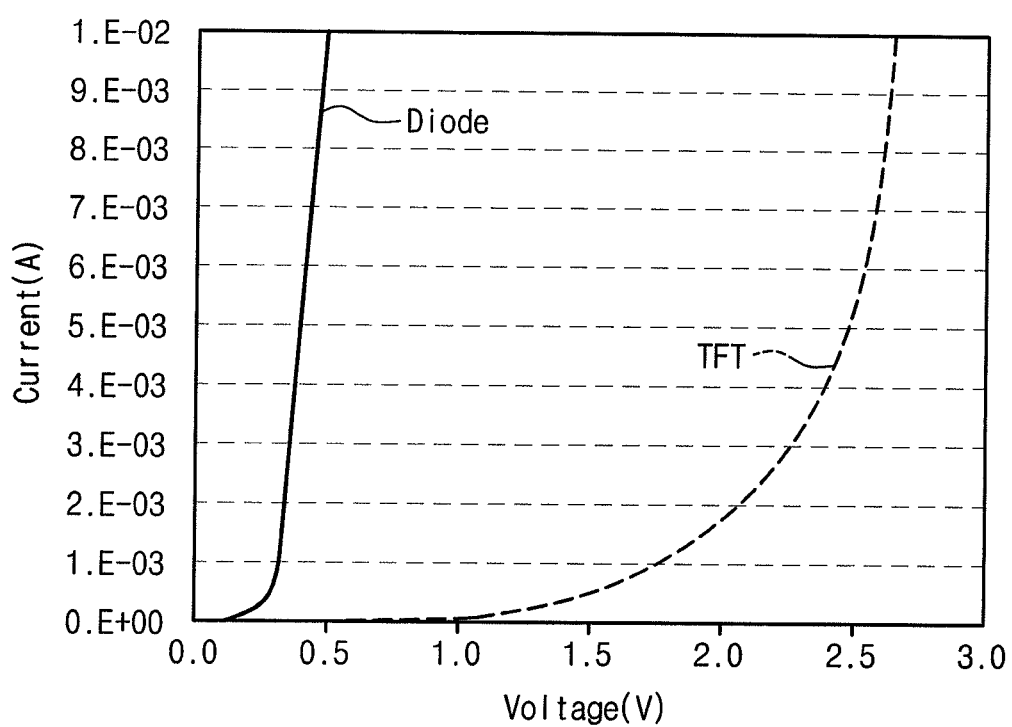
FIG. 8 is a graph showing a current-voltage characteristic of a diode of the charge pump shown in FIG. 1.

FIG. 8 is a graph showing a current-voltage characteristic of the diode 2131 according to an exemplary embodiment of the present invention. As shown in FIG. 8, a horizontal axis represents a voltage (V), and a vertical axis represents a current (A). The diode 2131 has a low threshold voltage, and the irregularity of the threshold voltage is small. In contrast, the thin film transistor (TFT) has a high threshold voltage, and the irregularity of the threshold voltage is great.

As shown in FIG. 1, a capacitor 2133 and a second diode 2134 are electrically connected in parallel between the first main electrode of the thin film transistor 215c and the output terminal 213c. The diode 2134 has a cathode area and an anode area electrically connected to the terminal (e.g. a voltage source terminal) of the circuit driving voltage VDD.

The diode 2134 receives power from the terminal of the circuit driving voltage VDD and reduces a boost time till the boost voltage VPP is reached in an initial stage of the driving of the second charge pump unit (VPP) 215. The boost voltage may be, for example, 5V. Since the diode 2134 is not required to minimize irregularity of a threshold value, or to increase current driving capability, the diode 2134 is preferably fabricated by using a non-monocrystal semiconductor, and may be installed as an external connection device similar to the diode 2131.

Figure 2:
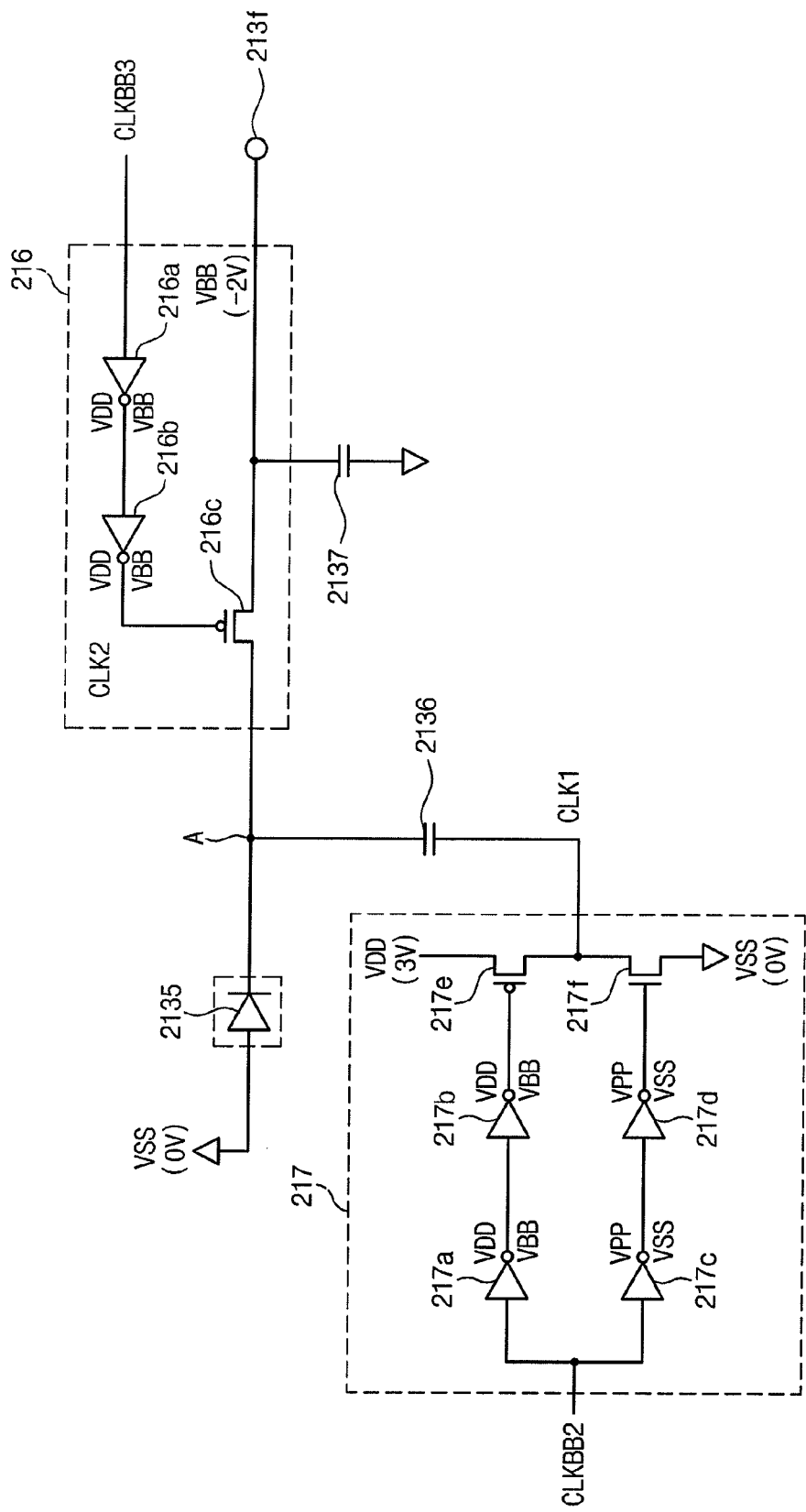
FIG. 2 is a circuit diagram showing a voltage drop charge pump of a DC/DC converter according to an exemplary embodiment of the present invention.

As shown in FIG. 2, the first charge pump unit (VPP) 217 of the charge pump 213 includes first serially connected inverters 217a and 217b, second serially connected inverters 217c and 217d, and complimentary transistors, which receives the clock signal CLKBB2 output from the timing controller 212. The complementary transistors include a p-channel conductive-type thin film transistor 217e and an n-channel conductive-type thin film transistor 217f. A control electrode (e.g., a gate electrode) of the p-channel conductive-type thin film transistor 217e receives the output of the inverter 217b. A control electrode of the p-channel conductive-type thin film transistor 217e receives the output of the inverter 217d. The above complementary transistors output a clock signal CLK1.

The second charge pump unit (VBB) 216 includes serially connected inverters 216a and 216b and a p-channel conductive-type thin film transistor 216c, which receive the sixth clock signal CLKBB3 output from the timing controller 212. A control electrode of the p-channel conductive-type thin film transistor 216c receives the output of the inverter 216b. The first main electrode (e.g., a source area) of the thin film transistor 216c is connected to the output terminal 213f. A channel area, a source area, and a drain area of the thin film transistor 216c include a non-monocrystal semiconductor.

The charge pump 213 includes a voltage drop capacitor 2136 that has a first electrode connected to the second main electrode (e.g., a drain area) of the thin film transistor 216c. The second electrode receives the clock signal CLK1 (e.g., a variable voltage) from the first charge pump unit (VPP) 217. A first diode 2135 is serially connected between the second electrode of the thin film transistor 216c, the first electrode of the voltage drop capacitor 2136, and the terminal of the circuit driving voltage (VSS) (e.g., a terminal of a power source). The diode 2135 includes a monocrystal semiconductor. The diode 2135 has a cathode area connected to the terminal of the circuit driving voltage (VSS) and an anode area connected to the first main electrode of the thin film transistor 216c. The diode 2135 may include a monocrystal semiconductor similar to the diode 2131, which is formed as an external connection device. A capacitor 2137 is electrically connected in parallel between the first main electrode of the thin film transistor 216c and the output terminal 213f.

When the clock signal CLK is input to the level shifter 211 of the DC/DC converter 21, the level shifter 211 generates clock signals CLK and CLKB, and the clock signals CLK and CLKB are output to the timing controller 212.

Figure 9:
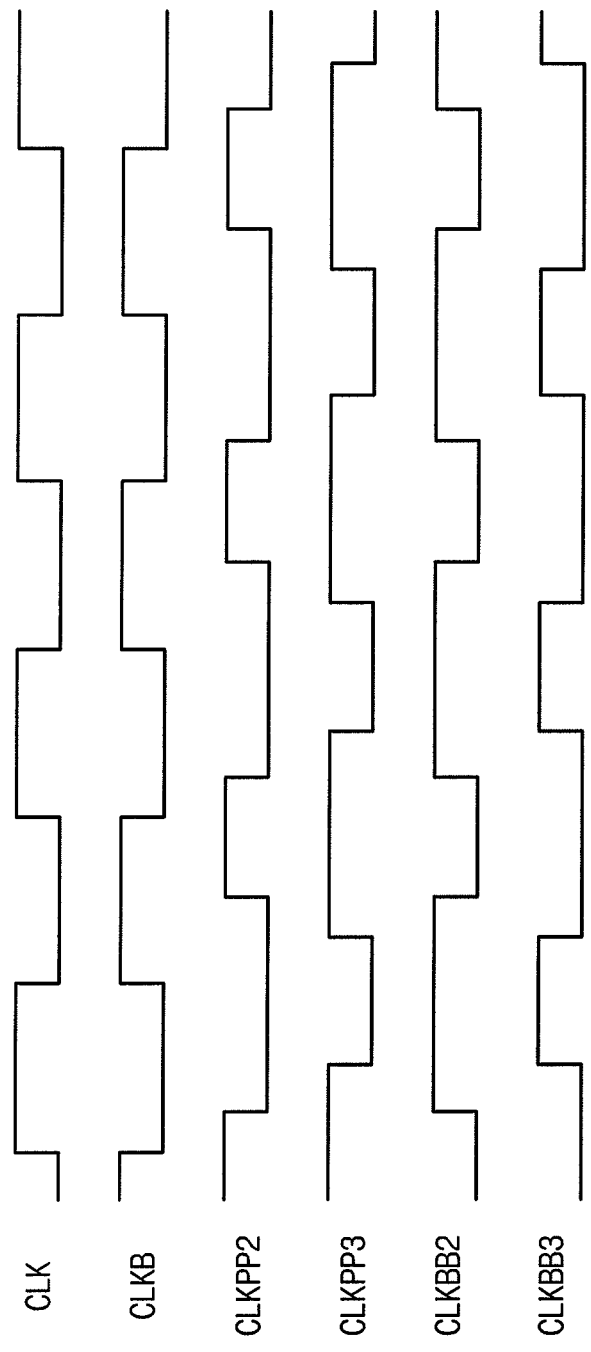
FIG. 9 is a timing chart explaining an operation of the timing controller shown in FIGS. 3 and 4.
Figure 10:
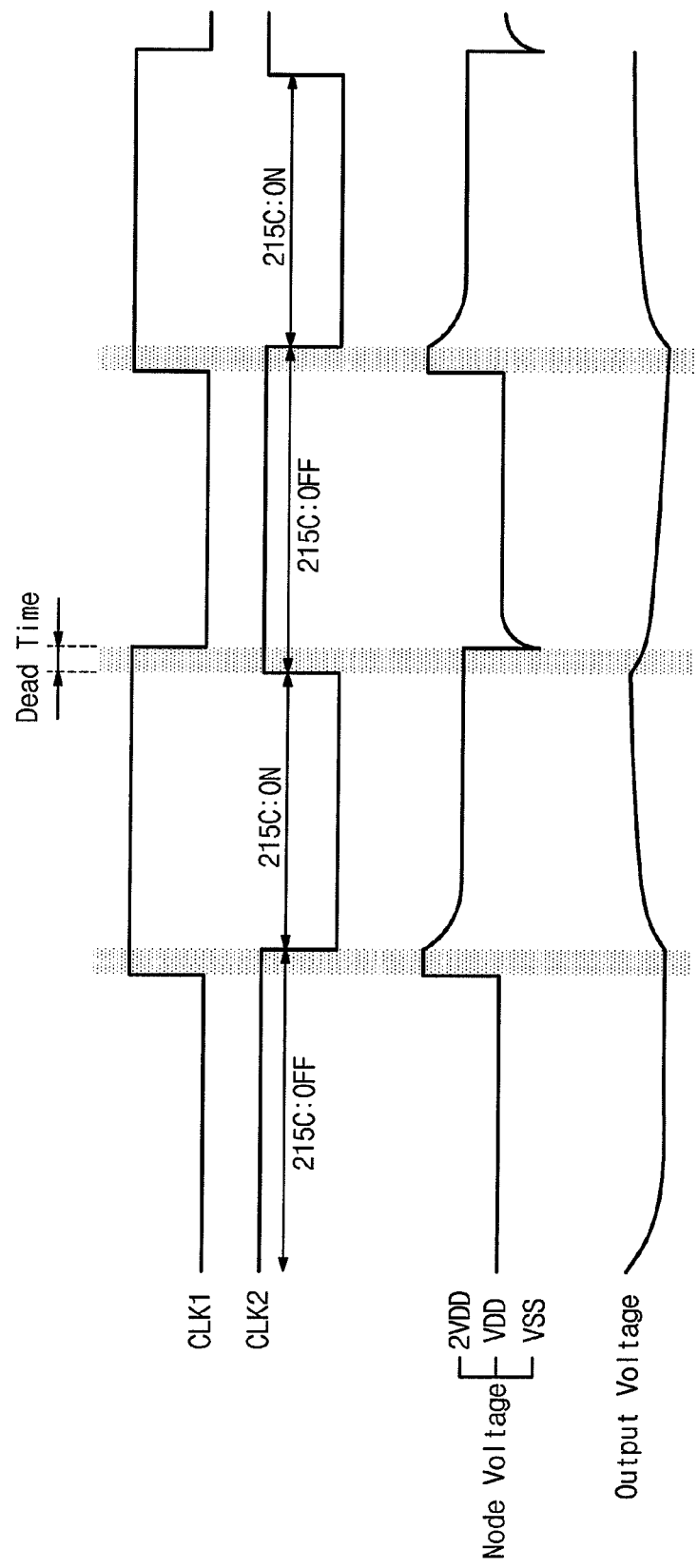
FIG. 10 is a timing chart explaining an operation of the voltage boost charge pump shown in FIG. 1.

As shown in FIG. 9, the timing controller 212 performs timing control such that the rising and falling times of the clock signal CLK1 (not shown in FIG. 9) supplied to the charge pump 213 do not overlap with the rising and falling times of the clock signal CLK2 (not shown in FIG. 9). The timing controller 212 delays falling times of the clock signal CLKPP3 in relation to falling times of the clock signal CLKPP2, and advances rising times of the clock signal CLKPP3 in relation to rising times of the clock signal CLKPP2. Similarly, the timing controller 212 delays rising times of the clock signal CLKBB3 in relation to rising times of the clock signal CLKBB2, and advances falling times of the clock signal CLKBB3 in relation to falling times of the clock signal CLKBB2.

The clock signal CLKPP2, which is generated from the timing controller 212 and subject to a timing control operation of the timing controller 212, is output to the first charge pump unit (VPP) 214. The first charge pump unit (VPP) 214 generates the clock signal CLK1 based on the clock signal CLKPP2. The clock signal CLK1 is supplied to the second electrode of the voltage boost capacitor 2132. The clock signal CLKPP3, which is generated from the timing controller 212 and subject to a timing control operation of the timing controller 212, is output to the second charge pump unit (VPP) 215. The second charge pump unit (VPP) 215 generates a clock signal CLK2 based on the clock signal CLKPP3. The clock signal CLK2 is applied to the control electrode of the thin film transistor 215c of the second charge pump unit (VPP) 215.

A high-level clock signal CLK1 is applied to the second electrode of the voltage boost capacitor 2132 as shown in FIG. 1. Since the thin film transistor 215c is in an on state due to the rising of the clock signal CLK2, the voltage at node A shown in FIG. 1 is raised by the circuit driving voltage VDD (e.g., the voltage at node A before the clock signal CLK1 rises above the circuit driving voltage VDD—the threshold voltage Vth of the diode 2131). Since an inverse voltage is applied to the diode 2131, a current from the terminal of the circuit driving voltage VDD connected to the diode 2131 does not flow through the diode 2131. Then, a low-level clock signal CLK2 is applied to the control electrode of the thin film transistor 215c. Due to the falling of the clock signal CLK2 derived from the rising of the clock signal CLK1, the thin film transistor 215c transitions to an on state, and electric charges charged in the voltage boost capacitor 2132 are output as boosted voltage VPP through the output terminal 213c of the thin film transistor 215c. The voltage at node A is slowly dropped with the output of the boosted voltage VPP. The amount of dropped voltage is defined as ΔV.

After a predetermined time interval elapses, a level of the clock signal CLK2 is raised, and a high-level clock signal CLK2 is applied to the control electrode of the thin film transistor 215c. The thin film transistor 215c transitions to an on state, and the output of the boosted voltage VPP to the output terminal 213c is stopped. Thereafter, a level of the clock signal CLK1 falls and the thin film transistor 215c transitions to an off state. The low-level clock signal CLK1 is applied to the second electrode of the voltage boost capacitor 2132. Through the above operation, the voltage at node A is lowered. The voltage at node A is obtained by subtracting the threshold voltage Vth of the diode 2131 and an amount ΔV of dropped voltage from the circuit driving voltage VDD. The above operation applies a forward voltage to the diode 2131, and a current flows through the diode 2131 until the voltage at node A becomes a value obtained by subtracting the threshold voltage Vth of the diode 2131 from the circuit driving voltage VDD. The above operations may be repeated as necessary.

Since the diode 2131 including the monocrystal semiconductor and the diode 2135 including the monocrystal semiconductor are employed for the switching devices of the circuit driving voltage VDD and the circuit grounding voltage VSS in the charge pump 213, the DC/DC converter 21 according to an exemplary embodiment of the present invention may reduce the irregularity of threshold voltage. In addition, since the threshold voltage may be reduced, the boost voltage VPP, or the drop voltage VBB may be sufficiently ensured, and the boost voltage characteristic, or the drop voltage characteristic may be improved.

In addition, since a control signal line is not required for the operation of the diodes 2131 and 2135, the circuit structures of the charge pump 213 and the timing controller 212 to control timing of a clock signal may be simplified. Further, since the charge pump 213 performs a control operation by using two types of clock signals CLK1 and CLK2, dead time between the clock signals CLK1 and CLK2 may be reduced, and high efficiencies of raising and dropping operations may be realized.

A liquid crystal display 1 equipped with a DC/DC converter 21 according to an exemplary embodiment of the present invention may achieve high efficiency of boosting and dropping operations and low power consumption. In addition, since the liquid crystal display 1 has a medium or small size, and the circuit driving voltage VDD is applied from a battery, the low power consumption enables the liquid crystal display 1 to operate for a longer time. The low power consumption may enable use of small-size batteries, with small-size devices, such as portable phones, wireless phones, digital cameras, and laptop computers mounted on the liquid crystal display 1.

According to an exemplary embodiment of the present invention, the position of the diode 2131 of the charge pump 213 in the DC/DC converter 21 of the liquid crystal display 1 according to the prior embodiment is changed. The present embodiment, will be described below using the same reference numerals as were assigned to the elements of the prior embodiment, and thus a detailed description thereof is not required.

Figure 11:
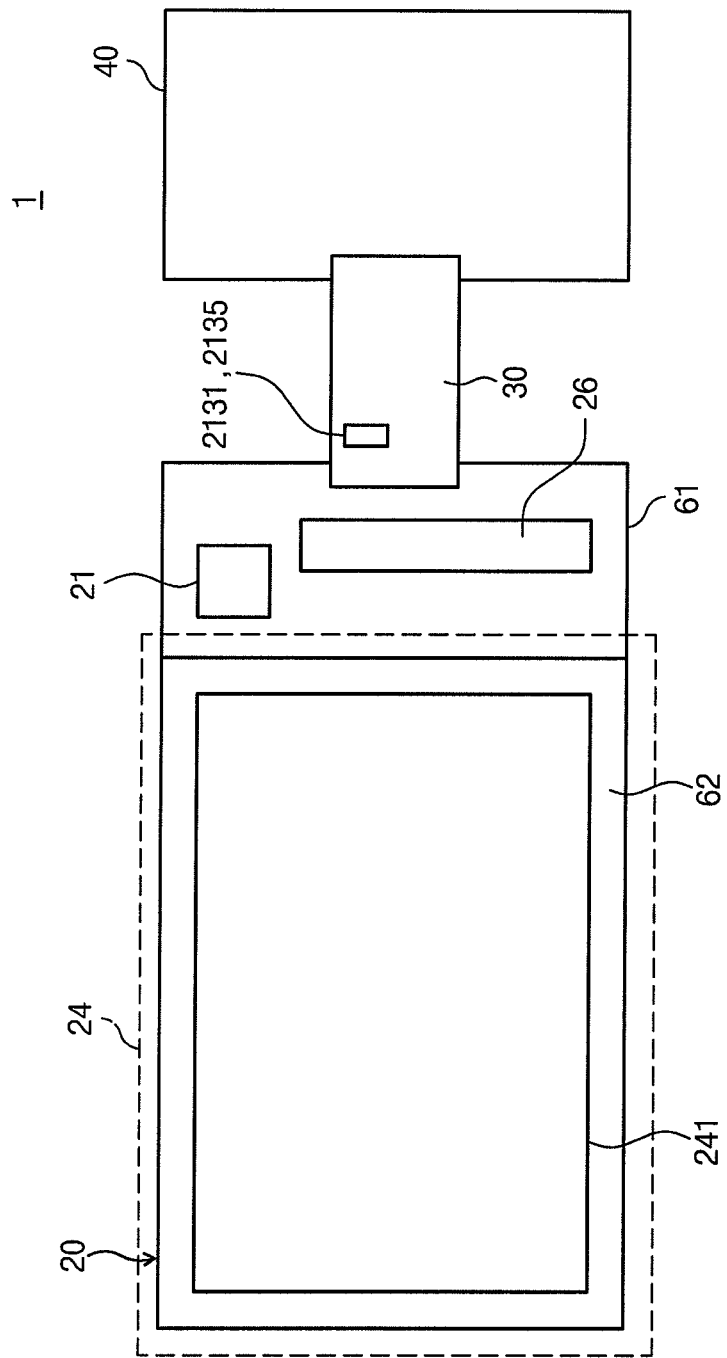
FIG. 11 is an assembled view of a DC/DC converter and a liquid crystal display according to an exemplary embodiment of the present invention.

A liquid crystal display 1 according to the present embodiment is shown in FIG. 11. The diodes 2131 and 2135 of the charge pump 213 of the DC/DC converter are installed on the flexible wiring substrate 30. The diodes 2131 and 2135 are preferably installed on one end portion of the flexible wiring substrate 30, which is close to the charge pump 21.

Figure 12:
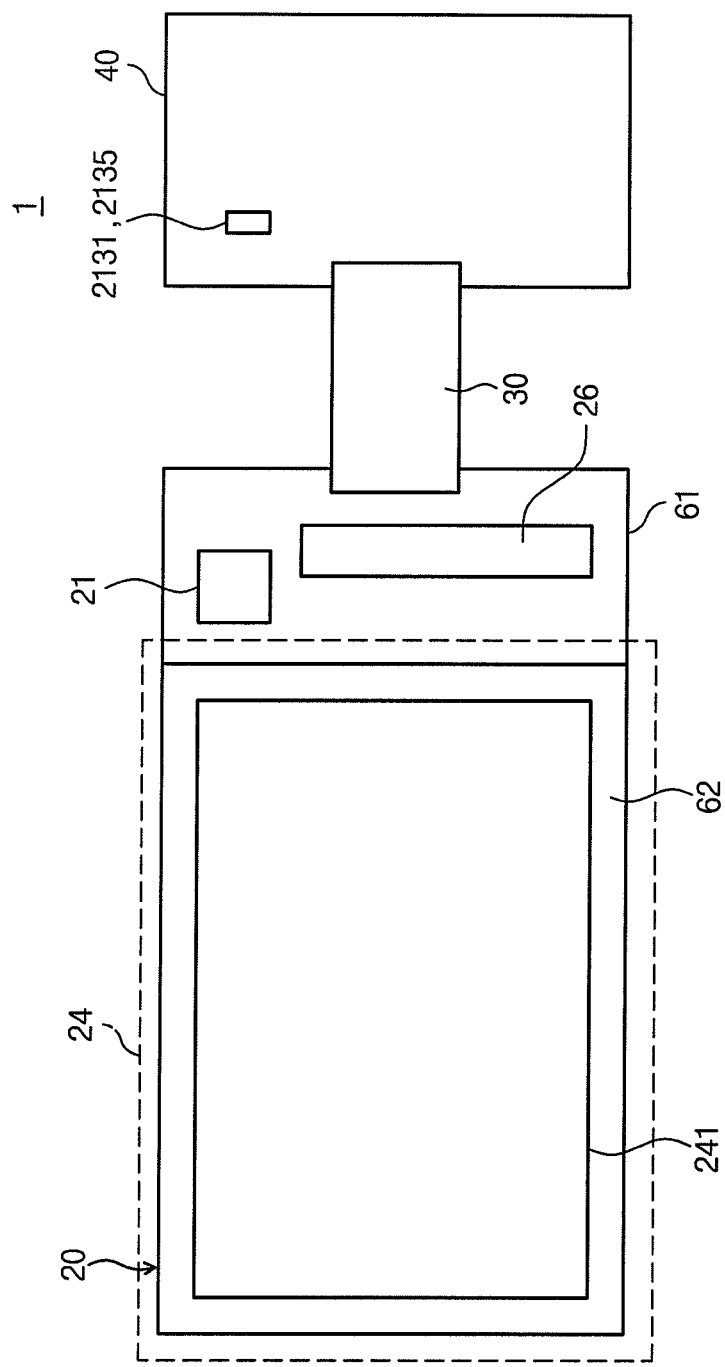
FIG. 12 is an assembled view of a DC/DC converter and a liquid crystal display according to an exemplary embodiment of the present invention.

FIG. 12 shows an another exemplary embodiment of the liquid crystal display 1 illustrated in FIG. 11. As shown in FIG. 12, the diodes 2131 and 2135 are installed on a printed circuit board 40.

While the present invention has been particularly shown and described with reference to exemplary embodiments thereof, it is to be understood that the present invention is not limited to these exemplary embodiments, but various changes and modifications can be made by one ordinary skilled in the art within the spirit and scope of the present invention. For example, the present invention may be adapted for an organic electro-luminescent device, where it is difficult to perform high-temperature heat treatment during the manufacturing process.

What is claimed is:
1. A DC/DC converter comprising:
a charge pump, wherein the charge pump comprises:
a thin film transistor formed on an insulating substrate, having a first main electrode connected to an output terminal outputting an output voltage and a control elec- trode receiving a control signal, and comprising a non-monocrystal semiconductor;
a capacitor having a first electrode directly connected to a second main electrode of the thin film transistor and a second electrode receiving a variable voltage; and
a first diode electrically connected between the second main electrode of the thin film transistor, the first electrode of the capacitor, and a power terminal in series, and comprising a mono-crystal semiconductor,
wherein the first main electrode is distinct from the second main electrode.

2. The DC/DC converter of claim 1, wherein the thin film transistor comprises one of polycrystal silicon and amorphous silicon.

3. The DC/DC converter of claim 2, wherein the first diode is an external connection device.

4. The DC/DC converter of claim 3, further comprising:
a first external connection terminal disposed on the insulating substrate, and electrically connected between the second main electrode of the thin film transistor and the first electrode of the capacitor; and
a second external connection terminal disposed on the insulating substrate, and connected to the power terminal, wherein terminals of the external connection device are connected to the first and second external connection terminals, respectively.

5. The DC/DC converter of claim 4, wherein the external connection device is mounted on the insulating substrate in a chip-on-glass structure.

6. The DC/DC converter of claim 1, wherein the charge pump comprises a voltage drop charge pump to receive a circuit grounding voltage from the power terminal and output a voltage that is obtained by dropping the circuit grounding voltage through the output terminal.

7. The DC/DC converter of claim 6, wherein the first diode comprises an anode area electrically connected to the second main electrode of the thin film transistor and a cathode area electrically connected to the power terminal.

8. The DC/DC converter of claim 1, wherein the charge pump comprises a voltage boost charge pump to receive a circuit driving voltage greater than a circuit grounding voltage from the power terminal and output a voltage, which is obtained by boosting the circuit driving voltage, through the output terminal.

9. The DC/DC converter of claim 8, wherein the first diode comprises a cathode area electrically connected to the second main electrode of the thin film transistor and an anode area electrically connected to the power terminal.

10. The DC/DC converter of claim 9, further comprising a second diode having a cathode area electrically connected in parallel between the first main electrode of the thin film transistor and the output terminal, and an anode area electrically connected to the power terminal.

11. The DC/DC converter of claim 1, further comprising a timing controller generating a clock signal such that a rising time and a falling time of the control signal input to the control electrode do not overlap with a rising time and a falling time of the variable voltage applied to the second electrode of the capacitor.

12. The DC/DC converter of claim 1, wherein the rising time of the control signal input to the control electrode of the thin film transistor is later than the rising time of the variable voltage applied to the second electrode of the capacitor, and the falling time of the control signal is faster than the falling time of the variable voltage.

13. The DC/DC converter of claim 1, further comprising a level shifter supplying a signal having an enlarged amplitude to the charge pump and the timing controller.

14. The DC/DC converter of claim 1, wherein the charge pump and the timing controller are supplied with a boosted circuit driving voltage.

15. A liquid crystal display comprising:
an insulating substrate having a first area and a second area adjacent to the first area;
a pixel array formed in the first area of the insulating substrate;
a driver formed in the second area of the insulating substrate to drive the pixel array; and
a DC/DC converter formed in the second area of the insulating substrate to supply a driving voltage to the driver,
wherein the DC/DC converter comprises a charge pump comprising:
a thin film transistor formed in the second area of the insulating substrate, having a first main electrode connected to an output terminal outputting an output voltage, and a control electrode receiving a control signal, and comprising a non-monocrystal semiconductor;
a capacitor having a first electrode directly connected to a second main electrode of the thin film transistor and a second electrode receiving a variable voltage; and
a first diode electrically connected between the second main electrode of the thin film transistor, the first electrode of the capacitor, and a power terminal in series, and comprising a mono-crystal semiconductor, and
wherein the first main electrode is distinct from the second main electrode.

16. The liquid crystal display of claim 15, further comprising:
an opposite substrate facing the first area of the insulating substrate; and
a liquid crystal interposed between the first area of the insulating substrate and the opposite substrate,
wherein the first diode is provided in the second area of the insulating substrate, and does not overlap with the opposite substrate.

17. The liquid crystal display of claim 16, wherein the first diode of the DC/DC converter is an external connection device.

18. The liquid crystal display of claim 17, further comprising:
a first external connection terminal formed in the second area of the insulating substrate, and electrically connected between the second main electrode of the thin film transistor and the first electrode of the capacitor; and
a second external connection terminal formed in the second area of the insulating substrate, and connected to the power terminal, wherein terminals of the external connection device are connected to the first and second external connection terminals, respectively.

19. A liquid crystal display comprising:
an insulating substrate including a first area and a second area adjacent to the first area;
a pixel array formed in the first area of the insulating substrate;
a driver driving the pixel array;
a DC/DC converter formed in the second area of the insulating substrate
to supply a driving voltage to the driver; and
a flexible printed wiring substrate adjacent to the insulating substrate, wherein the DC/DC converter comprises a charge pump comprising:

a thin film transistor formed in the second area of the insulating substrate, having a first main electrode connected to an output terminal outputting an output voltage, and a control electrode receiving a control signal, and comprising a non-monocrystal semiconductor;

a capacitor having a first electrode directly connected to a second main electrode of the thin film transistor and a second electrode receiving a variable voltage; and a first diode disposed on the flexible printed wiring substrate, electrically connected between the second main electrode of the thin film transistor, the first electrode of the capacitor, and a power terminal in series, and comprising a mono-crystal semiconductor, wherein the first main electrode is distinct from the second main electrode.

20. A liquid crystal display comprising:

an insulating substrate including a first area and a second area adjacent to the first area;

a pixel array formed in the first area of the insulating substrate;

a driver driving the pixel array;

a DC/DC converter formed in the second area of the insulating substrate to supply a driving voltage to the driver; and a printed circuit board controlling the pixel array, the driver, and the DC/DC converter, wherein the DC/DC converter comprises a charge pump comprising:

a thin film transistor formed in the second area of the insulating substrate, having a first main electrode connected to an output terminal outputting an output voltage, and a control electrode receiving a control signal, and comprising a non-monocrystal semiconductor;

a capacitor having a first electrode directly connected to a second main electrode of the thin film transistor and a second electrode receiving a variable voltage; and a first diode disposed on the printed circuit board, electrically connected between the second main electrode of the thin film transistor, the first electrode of the capacitor, and a power terminal in series, and comprising a mono-crystal semiconductor, and wherein the first main electrode is distinct from the second main electrode.

* * * * *